United States Patent [19]

Kessels

[11] 4,265,988
[45] May 5, 1981

[54] SELF-STICKING ADHESIVE TAPE

[75] Inventor: Cornelis P. H. Kessels, Venlo, Netherlands

[73] Assignee: Océ-van der Grinten N.V., Venlo, Netherlands

[21] Appl. No.: 13,089

[22] Filed: Feb. 21, 1979

[30] Foreign Application Priority Data

Feb. 24, 1978 [NL] Netherlands .................. 7802073

[51] Int. Cl.³ .......................... G03G 5/00; B32B 5/16
[52] U.S. Cl. .................................. 430/56; 428/323; 428/334; 428/354; 428/355; 428/483
[58] Field of Search ........... 339/147 C, 278 C, 278 D; 428/323, 327, 332, 336, 349, 352, 355, 402, 407, 520, 40, 328, 329, 334, 354, 408, 458, 480, 483; 252/511, 512, 513; 427/122, 207 B, 208; 430/56

[56] References Cited

U.S. PATENT DOCUMENTS

| | | | |
|---|---|---|---|
| 1,085,331 | 1/1914 | Glen | 427/208 |
| 1,147,668 | 4/1915 | Chiklis | 252/511 |
| 3,118,781 | 1/1964 | Downing | 428/458 |
| 3,205,088 | 9/1965 | Lambert | 428/355 X |
| 3,334,040 | 8/1967 | Conrad | 428/323 X |
| 3,475,213 | 10/1969 | Stow | 428/344 X |
| 3,496,063 | 2/1970 | Benning | 430/56 |
| 3,589,975 | 6/1971 | Andrews et al. | 428/458 |
| 3,926,625 | 12/1975 | van der Sterren | 96/1.5 X |
| 3,930,852 | 1/1976 | Tanaka et al. | 430/56 |
| 4,078,108 | 3/1978 | Brandstätter et al. | 428/323 X |
| 4,109,052 | 8/1978 | Anderson | 428/458 |
| 4,151,319 | 4/1979 | Sackoff et al. | 428/352 X |
| 4,151,344 | 4/1979 | Doss et al. | 428/352 X |
| 4,152,189 | 5/1979 | Guerin et al. | 428/349 X |

FOREIGN PATENT DOCUMENTS 150925  9/1976 Netherlands .

*Primary Examiner*—William J. Van Balen
*Attorney, Agent, or Firm*—Albert C. Johnston

[57] ABSTRACT

A self-sticking adhesive tape is provided which is particularly effective for joining free ends of a photoconductive belt at a side of the belt presenting a photoconductive layer of ZnO dispersed in a binding agent. The tape comprises a polyester support film provided on one side with a flexible electrically conductive layer to prevent retention of electrostatic charges and provided on the other side with an adhesive layer, made sticky preferably by an acrylate resin, having (a) an adhesive force of at least 200 Newton per meter and (b) a shear tolerance of not more than 1 mm, as determined by tests of the tape after its adhesive side has been adhered to such photoconductive layer. The conductive layer preferably consists essentially of a dispersion of carbon particles in a polymeric binder such as 60:40 copolymer of ethylene-terephthalate and ethylene-isophthalate, and the adhesive layer of a dried coating of an anionic dispersion in water of a finely divided acrylic ester containing carboxyl groups.

10 Claims, No Drawings

SELF-STICKING ADHESIVE TAPE

This invention relates to a self-sticking adhesive tape and more particularly to a self-sticking adhesive tape which is suitable for joining photoconductive belts, especially those which contain as the photoconductive layer a layer of zinc oxide dispersed in a binding agent.

Photoconductive belts having a photoconductive layer made of a zinc oxide-binder composition are known. For instance, U.S. Pat. No. 3,926,628 describes such a photoconductive belt made to be stored as a pile of zig-zag folded imaging portions, or belt sections, of which the first and the last sections are joined together by an adhesive strip. Thus an endless, zig-zag folded photoconductive belt is obtained, of which each image forming section is transported past all the functional stations of an indirect electrophotographic copying machine in the use of the belt.

The adhesive strip to be used for joining the ends of such a belt must meet a number of important requirements and must meet these throughout at least the service life of the photoconductive belt. The strip must not only have a good and stable adhesive force, but also a high shear resistance. Besides, the top side of the strip should not accept toner powder, which means that the top side must be sufficiently electrically conductive to prevent it from accepting or retaining electrostatic charges. Further the adhesive strip must be sufficiently flexible to withstand a multitude of bending movements as the belt is passed over guiding rollers and/or into and from a stack of zig-zag folded sections stored in a magazine, and the strip must also possess a high resistance to initial tearing.

The adhesive strips heretofore used have all been insufficient in regard to one or more of these requirements.

The principal purpose of the present invention is to provide an adhesive strip which amply meets the above-mentioned requirements. More particularly, the invention provides a self-sticking strip that combines a great adhesive force with a high shear resistance and moreover possesses a sufficiently conductive top side to prevent it from accepting electrostatic charges, and consequently also toner particles. Further, the strip has the required flexibility and high initial tearing strength.

A self-sticking adhesive tape in accordance with the invention, which is especially suitable for joining the ends of belts made with a photoconductive ZnO-binder layer, comprises a polyester support which at one side thereof is provided with a conductive layer having a thickness of about 5 $\mu$m and a surface resistance of $10^6$–$10^9$ ohms and at the other side is provided with an adhesive layer having (a) an adhesive force of at least 200 Newton/meter and (b) a shear tolerance not more than 1 mm. The stated values of adhesive force and shear tolerance are determined after a strip of the adhesive tape having its adhesive layer adhered to a photoconductive ZnO-binder layer has been preserved for 10 days, the value for adhesive force being determined at 80° C. and the value for shear tolerance being determined at a continued shear load of 2 Newton/cm$^2$ in an atmosphere at 45° C. and 30% relative humidity.

The polyester support preferably is a polyethylene-terephthalate film, such as Melinex, having a thickness of about 1 mil (=25.4 $\mu$m).

The conductive layer preferably consists essentially of a dispersion of carbon particles in a binding agent suitable for applying and holding the carbon particles to the polyester support. A suitable binder, for instance, is the DuPont product known as Adhesive 49000, which is a 60:40 copolymer of ethylene-terephthalate and ethylene-isophthalate.

The sticking agent for the adhesive layer preferably is an acrylate resin. Because of technological and environmental hygienic considerations, preference is given to an acrylate resin dispersed in water. An example of a suitable sticking agent is a product of BASF known as Acronal 85D, which is a finely divided anionic dispersion in water, without plasticizer, of an acrylic ester copolymer containing carboxyl groups.

For protecting the adhesive layer, before use of the tape, this layer is covered with a protection sheet. The protection sheet may be opaque or transparent, and may be made of paper or a plastic. The adhesive tape provided with a protection sheet may be formed into strips or rolls for convenience of handling, storage and use.

For obtaining an endless, zig-zag folded photoconductive belt, as above-mentioned, the leading edge of the first imaging section and the trailing edge of the last imaging section of a length of pre-folded belt are laid against each other with the photoconductive side facing upward; an adhesive strip of the desired length and width is taken; the protection sheet is removed from this strip; and the adhesive layer of the strip is pressed onto the contiguous ends of the belt. The conductive layer of the adhesive strip in joining condition is thus situated at the topside of the belt, so that the conductive layer prevents the adhesive strip from being charged and consequently attracting toner particles in the use of the belt. If the adhesive strip should attract toner particles, this would lead to undesired impoverishment of the toner supply in the apparatus employing the belt and to contamination of the copying apparatus and the copies produced.

EXAMPLE

The self-sticking adhesive tape according to the invention can be manufactured as follows:

7.0 g of binding agent (Adhesive 49000) are dissolved in 82.4 g of methylene chloride and 9.2 g of ethyleneglycol monomethylether, and in the solution thus obtained 1.4 g of carbon particles (Corax L of Degussa) are dispersed. A layer of the carbon dispersion is applied, for instance by means of a small rod, onto a polyester film (Melinex) having a thickness of 1 mil (=25.4 $\mu$m). The conductive layer thus formed contains about 5 g of dry material per m$^2$ after drying for about 1 minute at about 100° C. Similarly, a layer of the sticking agent (Acronal 85 D) amounting to about 25 g/m$^2$ after drying is applied to the other, still free side of the polyester support film.

The adhesive side of the tape thus obtained is joined with a protective covering sheet, after which the tape and covering sheet are wound up into a roll. The protective sheet, for instance, consists of paper provided at one side with a polyethylene layer coated with a layer of silicon rubber for easy release of the paper from the adhesive layer on the tape.

What is claimed is:

1. A self-sticking adhesive tape, particularly suitable for joining ends of a belt at a side thereof presenting a photoconductive layer of zinc oxide in a binder, said tape consisting essentially of a polyester support film provided at one side thereof with a flexible layer consisting essentially of conductive particles in a polymeric binder and suffiently electrically conductive to prevent said layer from holding electrostatic charges, and at the other side with an adhesive layer having (a) an adhesive force of at least 200 Newton/meter and (b) a shear tolerance of not more than 1 mm, property (a) being determined at 80° C. after a strip of the tape having its adhesive layer adhered to such photoconductive layer has been preserved for 10 days, and property (b) being determined, after such strip has been so preserved, at a continued shear load of 2 Newton/cm$^2$ in an atmosphere at 45° C. and 30% relative humidity.

2. A self-sticking adhesive tape according to claim 1, said conductive layer having a surface resistance of $10^6$–$10^9$ ohms.

3. A self-sticking adhesive tape according to claim 1 or 2, said conductive layer consisting essentially of a dispersion of carbon particles in a polymeric binding agent.

4. A self-sticking adhesive tape, particularly suitable for joining ends of a belt at a side thereof presenting a photoconductive layer of zinc oxide in a binder, said tape consisting essentially of a polyester support film provided at one side thereof with a flexible electrically conductive layer and at the other side with an adhesive layer having (a) an adhesive force of at least 200 Newton/meter and (b) a shear tolerance of not more than 1 mm, property (a) being determined at 80° after a strip of the tape having its adhesive layer adhered to such photoconductive layer has been preserved for 10 days, and property (b) being determined, after such strip has been so preserved, at a continued shear load of 2 Newton/cm$^2$ in an atmosphere at 45° C. and 30% relative humidity; said conductive layer consisting essentially of a dispersion of carbon particles in a polymeric binding agent; said binding agent being a 60:40 copolymer of ethylene-terephthalate and ethylene-isophthalate.

5. A self-sticking adhesive tape according to claim 1 or 2, said adhesive layer containing an acrylate resin as the sticking agent thereof.

6. A self-sticking adhesive tape according to claim 5, said adhesive layer having been formed by drying on said film a coating of an anionic dispersion in water of a finely divided acrylic ester copolymer containing carboxyl groups.

7. A self-sticking tape, particularly suitable for joining ends of a belt at a side thereof presenting a photoconductive layer of zinc oxide in a binder, said tape consisting essentially of a polyester support film provided at one side thereof with a flexible electrically conductive layer and at the other side with an adhesive layer having (a) an adhesive force of at least 200 Newton/meter and (b) a shear tolerance of not more than 1 mm, property (a) being determined at 80° C. after a strip of the tape having its adhesive layer adhered to such photoconductive layer has been preserved for 10 days, and property (b) being determined, after such strip has been so preserved, at a continued shear load of 2 Newton/cm$^2$ in an atmosphere at 45° C. and 30% relative humidity; said conductive layer consisting essentially of a dispersion of carbon particles in a 60:40 copolymer of ethylene-teraphthalate and ethylene-isophthalate, said adhesive layer having been formed by drying on said polyester film a coating of an anionic dispersion in water of a finely divided acrylic ester copolymer containing carboxyl groups.

8. A self-sticking adhesive tape accordng to claim 4, said conductive layer having a thickness of about 5 μm and a surface resistance of $10^6$–$10^9$ ohms.

9. A self-sticking adhesive tape according to claim 7, said conductive layer having a thickness of about 5 μm and a surface resistance of $10^6$–$10^9$ ohms.

10. A photoconductive belt for an electrophotographic copying machine, comprising a flexible photoconductive belt having on its imaging side a photoconductive layer of zinc oxide dispersed in a binder and having ends of the belt joined together by a tape applied onto said layer, said tape being a self-sticking adhesive tape according to claims 1, 2, 3, 4, 5, 6, 7, 8, or 9.

* * * * *